United States Patent Office 2,763,573
Patented Sept. 18, 1956

2,763,573

METHOD OF MAKING A GLASS FIBER ARTICLE AND ARTICLE PRODUCED THEREBY

Lawrence P. Biefeld, Granville, Ohio, assignor to Owens-Corning Fiberglas Corporation, a corporation of Delaware No Drawing. Application June 24, 1952,
Serial No. 295,365

15 Claims. (Cl. 117—72)

This invention relates to the treatment of mineral fibers, such as glass fibers and it relates more particularly to the coating of glass fibers with a composition which is capable of functioning in itself as a size or binder and which renders the glass fibers more receptive to various materials, such as resinous substances. Glass fibers treated in accordance with the practice of this invention are suitable for use in combination with resinous or plastic materials in the manufacture of coated fabrics, glass fiber reinforced plastics and laminates, and various other structural products, or as coloring bases used to prepare the glass fibers for printing or dyeing, or to modify the surface characteristics of glass fibers for rendering them more receptive or more repellent to materials associated therewith as in the resinification of emulsified systems and the like.

Description herein will be directed chiefly to the treatment of glass fibers to provide a protective coating thereon and to render them more receptive to resinous materials, but it will be understood that the basic concepts may be used to introduce one or more of the other described characteristics.

While in the dry state, a fair amount of adhesion is capable of being developed between the glass fiber surfaces and many resinous materials but the adhesion is markedly reduced and complete separation very often takes place between the resinous material and the glass fiber surfaces under high humidity conditions. This is believed to result from the fact that the glass fiber surfaces are hydrophilic in character so that a film of moisture forms between the glass fiber surfaces and the resinous materials to reduce their bonding relation therebetween, especially under high humidity conditions. As a result, the wet strength of coated fabrics, reinforced plastics and laminates is but a fraction of the dry strength and coating compositions and coloring bases are invariably removed when the coated fibers are subsequently processed in aqueous medium or the like.

Considerable research has been devoted to the study of the factors for rendering the surfaces of glass fibers more receptive to various materials whereby, as in a resin and glass fiber system, strong adhesion will continue to exist under various atmospheric conditions and exposure to various humidity conditions. A number of systems have been proposed for rendering the glass fiber surfaces more receptive to resinous materials.

In one system, described in the Steinman Patent No. 2,552,910, issued on May 15, 1951, glass fiber surfaces are modified to increase their bonding relation with resinous material by treatment of the glass fibers with a complex compound of the Werner type wherein an acido group having less than 7 carbon atoms and containing a highly functional group is coordinated with the trivalent nuclear chromium atom. It is believed that in this system the nuclear chromium atom becomes oriented by physical-chemical attraction with groupings that exist on the glass fiber surfaces while the highly functional group in the acid chain provides a base which is highly receptive to resinous materials so that a strong bonding relation is established.

In another system, the glass fiber surfaces are treated with a base amine in the form of a cationic amine or the like in which an organic group attached to the basic nitrogen atom and containing less than 7 carbon atoms is provided with an unsaturated carbon to carbon linkage or other highly functional group. The base amine is believed to be capable of orienting with groups that predominate on the glass fiber surfaces to establish a strong bonding relation therebetween while the functional groups provide a receptive base for resinous materials and the like.

While such treating compositions appear successfully to modify the surface characteristics of glass fibers to improve their bonding relation with resinous materials and the like, still further improvements are desired and such treating compositions are incapable of use as a size or binder for the glass fibers. A separate coating operation is required to protect the glass fibers against destruction by mutual abrasion or to bond the glass fibers and to form a satisfactory yarn or strand, or to provide a satisfactory base for other coatings or coloring compositions.

It is an object of this invention to provide a further improvement in the treatment of glass fibers to modify the characteristics of the surfaces thereof and to increase the bonding relation with resinous materials and other coating or coloring agents, and it is a related object to produce a new and improved fibrous product embodying same.

Another object is to treat glass fibers with a film forming composition which becomes strongly bonded to the glass fiber surfaces permanently to modify the surface characteristics thereof and which is capable simultaneously of functioning as a size or binder for the glass fibers.

A further object is to size glass fibers in forming or subsequent thereto with a composition that renders the fibers preferentially receptive to resinous materials combined therewith in the manufacture of coated fabrics, reinforced plastics and laminates, colored textiles and other bonded structures.

A still further object is to coat glass fibers in forming or subsequent thereto with a film forming composition that becomes strongly anchored to the glass fiber surfaces and modifies the characteristics thereof to render the glass fibers less receptive to water whereby substances combined with glass fibers are not displaced by water film in the presence of high humidity and further to render the glass fibers more receptive to other substances such as resinous materials which enable a strong bonding relation to be developed between the resinous materials and the glass fibers even in the presence of high humidity.

The objects of this invention have been achieved by treating the glass fibers in forming or subsequent thereto with a substance that preferentially bonds to the glass fiber surfaces, even in the presence of high humidity, and provides a film on the glass fiber surfaces for protection of the glass fibers in the manner of a size or binder. By proper construction of the film forming substance applied to the glass fibers, the characteristics of the coated fibers can be selectively modified to be receptive to a wide variety of materials heretofore incapable of anchorage or efficient use with glass fibers in their normal form. Thus the glass fibers can be provided with a protective coating and made highly receptive to coloring agents for dyeing or printing, to resinous materials for the manufacture of improved coated fabrics, reinforced plastics or laminates, and to rubber-like materials for use in the manufacture of tire cord and other structural products and the like.

For improving the bonding relation between resinous materials and glass fiber surfaces, the treating composition is formulated to coat the fibers with a film forming reaction product of a polyester resin forming material and an organo silane having an unsaturated carbon to carbon linkage. The polyester and the organo silane may be combined by chemical reaction prior to formulation of the composition for treating the glass fibers or they may be introduced in the desired proportions for reaction whereby combination occurs as the coating is set on the glass fiber surfaces.

The following examples of the practice of this invention are given by way of illustration and not by way of limitation:

Example 1

A polyester resin is formed of 130 parts itaconic acid, 76 parts propylene glycol and 0.4 part of a 2 percent solution of hydroquinone inhibitor by reaction at elevated temperature until an acid number of about 65 is reached. Reaction to this stage generally requires about 5 hours of refluxing at a temperature of 185° C. in an inert atmosphere of carbon dioxide or nitrogen.

Diallyl diethoxy silane is incorporated in a ratio of about 10 percent by weight of the polyester resin in solution in toluene. The ethoxy silane is believed to react in an ester interchange with the polyester upon the elimination of solvent at elevated temperature as follows wherein R is the dibasic acid residue and R' is the polyol residue:

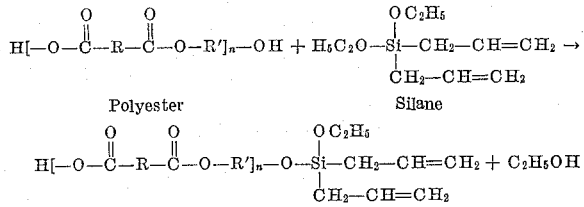

The reaction product is dispersed or emulsified in aqueous medium preferably containing ammonia to form a treating composition containing 2–4 percent solids. In use, the treating composition may be wiped onto the glass fiber surfaces in forming, as by the process described in the Biefeld Patent No. 2,392,805, and the coated fibers can be permitted to be air dried but it is preferably dried at elevated temperatures, such as temperatures within the range of 150–350° F. to improve the bonding relation.

The treated glass fibers may be used as a reinforcement with resinous materials in the manufacture of molded plastics having improved strength properties. They may also be woven into a textile fabric for use as plies in combination with resinous materials in the manufacture of reinforced plastics. When combined to form a laminate with an unsaturated polyester laminating resin of the type 911–11, marketed by the Plaskon Corporation, and baked at a temperature of 130° F. for 45 minutes after air drying for 30 minutes at room conditions, a new and improved laminate is formed having a dry flexure strength of 227,000 p. s. i. The wet strength measured after immersion for about 7 day of the formed product is 206,000 p. s. i. which is equivalent to a retention of 95.5 percent of the dry strength under high humidity conditions. With standard polyesters of the type produced by the Plaskon Corporation under the trade name Plaskon 911–11, a dry flexure strength of 200,000 p. s. i. is secured by treating the glass fibers with an emulsion of the composition of Example 1 while the dry strength developed from solvent solution is 187,000 p. s. i. The retention of strength under wet conditions is 87 percent of the dry strength from emulsion treatment and 65 percent from solvent treatment. Generally this preference of emulsion over solvent solution follows with other systems of the types embodied herein. When the fibers are treated with the polyester alone, the dry flexure strength of the resulting laminate is about 180,000 p. s. i. but the wet strength falls to 71,000 p. s. i., a retention of only 39 percent. Corresponding compositions prepared with glass fiber fabrics treated with compositions of the type heretofore employed are incapable of developing dry flexure strengths of the magnitude produced in accordance with the practice of this invention and the retention of strength under wet conditions generally results in a loss of 25 to 40 percent of the dry strength.

The polyester resinous component may be prepared of other ingredients such for example as the combination of diethylene glycol and maleic anhydride or the reaction product of diethylene glycol, maleic anhydride and phthalic anhydride or by the recation of itaconic acid and propylene glycol but it is preferred that the polyhydric alcohol be present in amounts to supply hydroxyl groups in excess of that capable of reaction with the saturated or unsaturated polybasic acid so as to insure the presence of free hydroxyls for combination with the silane and for orientation with the glass fiber surfaces. Other polyhydric alcohols may be used such as pentaerythritol or triglycerols and other saturated or unsaturated polybasic acids may be used, such as fumaric acid and the like in various combinations.

For reaction with the polyester resin, it is preferred to make use of a silane having two or more replaceable or hydrolyzable groups such as ethoxy or methoxy groups or halogen groups and in which the organic radical containing the unsaturated carbon to carbon linkage has less than 8 carbon atoms in straight chain arrangement unless more than one unsaturated carbon to carbon linkage is present, although the carbon atoms present in the organic group may total more than eight when branched with other organic groups containing less than 8 carbon atoms in an aliphatic chain. If the aliphatic chain exceeds 8 carbon atoms, the functionality or activity of the unsaturated group tends to be overcome whereby the coating become less receptive to resinous material and the like. Other silanes which may be used in the practice of this invention for improving adhesion of resinous materials or to render the glass fiber surface resinophilic include triethoxy allyl silane, vinyl triethoxy silane, divinyl diethoxy silane, vinyl trichloro silane, alone or in combination with beta-chlorallyl alcohol to form beta-chloroalloxyvinyldichloro silane, dimethoxy dicrotenyl silane, triethoxy methallyl silane, dichloro ditiglyl silane, and the like.

The amount of silane required may be that which is sufficient to permit coupling with the applied resinous material but it is preferred to make use of an amount to provide for a free hydrolyzable group for orientation or reaction with hydroxy groups that exist on the glass fiber surfaces. Amounts within the range of 5 to 10 percent by weight of the polyester resin have, to the present, given best results with respect to providing a protective coating on the glass fiber surfaces while rendering the coated fibers highly receptive to resinous materials but amounts within the range of 2–20 percent by weight of the polyester may be used.

Coupling between the coated glass fibers and resinous materials applied thereto is believed to occur when the resinous material contains available unsaturated carbon to carbon linkages as in the unsaturated polyester resins used for low pressure laminating and the like formed of a polybasic acid such as maleic, fumaric, itaconic or phthalic acid and an alcohol or glycol such as allyl alcohol, ethylene glycol, diethylene gycol and the like, alone or in combination with an unsaturated hydrocarbon, such as styrene, butadiene and the like. When the polyester is formed only of an acid and alcohol, then one or the other or both must contain at least one unsaturated group. When modified with an unsaturated hydrocarbon, such as styrene or butadiene, the acid or alcohol components must be unsaturated depending upon the properties desired and the amount of cross-linking. Available unsaturation for coupling also exists when the resinous material is of the solventless varnish type or casting resin formed of allyl alcohol or the like.

While improvement in the bonding relation is most evident with resinous materials having groupings available for coupling with the unsaturated groups in the glass fiber coating, considerable improvement in bonding relation is also experienced with the combination with resinous materials formed by addition polymerization, such as polyvinyl acetate, polyvinyl chloride, polymethylmethacrylate, polystyrene, polyvinylidene chloride, polyethylene, polybutylene, polytrichlorotrifluoroethylene and natural or synthetic rubbers such as neoprene, butadiene-styrene copolymer, butadiene-acrylonitrile copolymer, rubber hydrochloride and the like.

A sufficient amount of the treating material for functioning as a size and a receptive base for resinous materials may be secured by treatment of the glass fibers with an emulsion or solution containing from 1 to 20 percent by weight of the polyester-silane combination. For modification of the surfaces merely to provide improved resinous adhesion, it will be sufficient if a monomolecular film is formed on the glass fiber surfaces. Dilution to the desired concentration for coating the fibers may be achieved in aqueous emulsion. Instead, and especially when the polyester and silane are introduced as separate ingredients into the treating composition, it is preferred to reduce the polyester and silane combination to the desired concentration in solvent medium, such as in acetone, toluene or the like.

Application may be made to the glass fibers in forming while the glass fibers are clean and orientation between the polyester-silane reaction product and groupings that predominate on the glass fiber surfaces may take place without interference. In the event that treatment to coat and modify the glass fibers takes place after the glass fibers have been formed such as while the glass fibers are in strands, yarns or fabrics, then it is desirable first to remove the coatings or size previously applied, as by washing or burning off, so as to present a clean dry surface for proper orientation with the polyester-silane system.

Application to formed yarns, strands and fabrics may be made by conventional techniques, such as by dip coating, flow coating, spray coating, roller coating or the like, followed by air drying but preferably by drying in an air circulating oven heated to a temperature of about 200–450° F. to drive off the diluent and set the reaction product on the glass fiber surfaces.

By proper selection of the silane to provide a construction other than an unsaturated carbon to carbon linkage, it is possible to render the surfaces of the treated glass fibers preferentially receptive to a variety of other substances in preference to water. If the organic group of the silane is constructed with a highly functional group, as defined in the aforementioned Steinman patent, then the glass fibers may be modified preferentially to receive substances capable of coordinating therewith. For example, the organic groupings on the silane may be formulated to contain a functional group in the form of a labile hydrogen atom whereby the treated glass fiber surfaces become more receptive to compounds having an atom of oxygen, nitrogen or solvent present in the form of an ether, ester, ketone or aldehyde or as a cyano, azo, amide or nitro group, or as the nitrogen atom in a heterocyclic group, or the corresponding thio compounds of the aforementioned oxygen containing groups. In the alternative, the functional group may constitute one of the latter groupings for orientation with a labile hydrogen atom in a compound for which the glass fibers become more attractive.

The functional group in the organo silane may comprise a group having a high dipole moment for coordination with materials also having polar characteristics. Such polar groups include halogeno, cyano, nitro, nitroso, amino groups and the like.

The functional grouping may comprise a hydrogen atom having a highly negative group associated therewith for activation such for example as a chlorine, fluorine, bromine or iodine group or a highly unsaturated group such as a vinyl, allyl, methallyl, propargyl, propenylidene and cyano.

When a highly functional group of the type formed by a labile hydrogen atom or a hydrogen atom closely associated with an electro-negative group is present in the silane with which the polyester is reacted, the treated glass fiber surfaces appear to be more receptive to materials such as polyvinyl chloride, polyvinyl acetate, polyacrylates, polymethacrylates, polystyrenes, chlorinated derivatives of polystyrene, polyvinyl carbazoles, synthetic rubbers, nitrocellulose, cellulose ethers and esters, polyamides and the like.

Other examples illustrating the practice of the invention will hereinafter be given:

*Example 2*

A polyester may be formed by a reaction of 100 parts itaconic acid with 80 parts propylene glycol in the presence of .4 of 1 percent hydroquinone in 2 percent solution. The reaction is carried out at a temperature between 175–220° C. until an acid number of 60 to 75 is reached.

The polyester in solution with toluene is combined with diallyl dichloro silane in acetone solution to form a treating composition in which the diallyl dichloro silane is present in an amount corresponding to 6 percent by weight of the polyester resin. The chloro silane probably reacts with the polyester to form polyester silane polymers with the elimination of hydrogen chloride, as represented by the following equation:

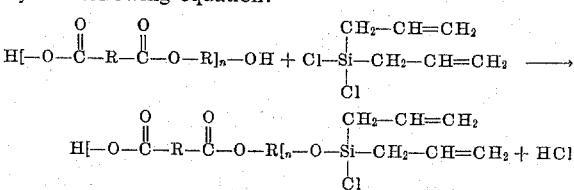

*Example 3*

Yarns of glass fibers from which the size has been removed by burning at 800° F. for 1 hour are passed continuously through a bath of the treating composition to coat the fibers substantially throughout their lengths with the polyester-silane composition and then the fibers are passed through an air drying oven heated to a temperature of about 250° F. to remove the diluent and set the reaction product that is formed on the glass fiber surfaces.

The coated strands may be woven into a textile fabric that is capable subsequently of being printed with ordinary dye compositions in the manufacture of a printed or colored fabric. Suitable dyes may comprise methyl violet, Victoria blue, malachite green, rhodamine dyes, nigrosine dyes, alizarine dyes, and lake forming pigments such as lithol red, toludine red, Hansa yellow and the like. Instead, the treated fibers in strand or fabric form may be colored by suitable inorganic pigments ground into a resinous base selected of resinous material of the type previously described wherein the pigment may be represented by cadmium red, chrome yellow, molybdate orange, Paris green, carbon black and the like.

*Example 4*

A polyester resin may be formed by reaction of 310 parts diethylene glycol and 540 parts maleic anhydride with 0.4 part hydroquinone in 2 percent solution. Reaction may be carried out for 4 hours at 146° F. followed by 2 hours at 165° C. and 1 hour at 200° C. until a resinous product is produced having an acid number of about 30 to 100. 4 parts by weight vinyl triethoxy silane is incorporated per 100 parts of the polyester resin in solvent solution and the composition is heated at a temperature of about 300° F. until the diluent is driven off and a reaction product formed. The product may be dispersed in aqueous medium to produce a treating composition having a solids content of about 20 percent for sizing glass fibers in forming or for providing glass fibers in forming or subsequent thereto with a base for use in subsequent treatment with resinous materials in the manufacture of composite structures.

*Example 5*

Fibers prepared in accordance with Example 4 may be dispersed in liquid medium formed principally of allyl alcohol in a monomeric state or in a partially advanced stage and catayzed with benzoyl peroxide to form a cast product in which the glass fibers are present as a reinforcement and in which it is believed that coupling takes place between the unsaturated groups in the silane integrated with the glass fiber surfaces and unsaturated groups in the allyl alcohol to effect a bonding relation therebetween.

*Example 6*

A polyester is formed by reaction of 310 parts diethylene glycol, 400 parts maleic anhydride and 150 parts phthalic anhydride reacted at a temperature of about 200° C. in the presence of 0.4 percent hydroquinone until an acid number of 80 to 120 is reached. The reaction product is combined with 10 parts by weight vinyl trichloro silane, and beta-chloro allyl alcohol in combination per 100 parts by weight of the polyester resin and dissolved in acetone to form a treating composition having a solids content of about 2 to 5 percent by weight.

The composition may be applied to glass fibers in forming to size the glass fibers and to provide a receptive base for resinous material. Laminates formed with Plaskon 911–11, a polyester resin, have a dry tensile strength of 208,000 p. s. i. and a wet strength retention of 70–85 percent.

*Example 7*

A polyester resin of the type formed in Example 1 is combined with 6 parts by weight diethyl monochloro ethoxy silane per 100 parts by weight of polyester resin and dissolved in toluene and heated at elevated temperature to remove the toluene and form a reaction product between the polyester and the silane which is emulsified in water containing ammonia to produce a composition containing 2 to 5 percent by weight solids. The composition may be used for treating glass fibers to provide a size thereon in the manufacture of strands, yarns or fabrics and to provide a base which is highly receptive to coloring agents or resinous materials.

*Example 8*

The composition of Example 1, instead of reacting the ingredients upon elimination of toluene, may be introduced in corresponding amounts to form a 2 percent solution in acetone. Upon application to the glass fibers in forming and elimination of the solvent at elevated temperature, a coating is formed on the glass fibers whereby, when the glass fibers are woven into a fabric and combined with low pressure laminating resins of the type Plaskon 911–11, a laminate is produced having a dry flexure strength of 197,000 p. s. i. and a wet flexure strength of 174,000 p. s. i. which corresponds to a retention of more than 88 percent of the strength as compared to retentions of 30 to 45 percent strength in the absence of treating compositions of the type described on glass fiber surfaces.

It will be understood that the concepts described and claimed herein are applicable also to the modification and the treatment of other siliceous fibrous elements, such for example as mineral wool fibers, asbestos fibers and the like which are, in their natural state, preferentially receptive to water and in which physical anchorage of resinous material is not readily made available.

In operation it is believed that the hydrolyzable group remaining in the silane is capable of attachment to the glass fiber surfaces or the surfaces of other mineral fibers by way of reaction with the hydroxy groups to HX or ROH or $H_2O$ depending on whether the hydrolyzable group is a halogen, an alkoxy group or a hydroxy group formed by hydrolyzation of the hydrolyzable group. It is also believed that hydroxy groups available in the polyester also function to improve the combination of the polyester-silane with the fiber surfaces.

It will be further understood that invention herein lies in the method for treating glass fibers as well as the products produced thereby and that changes may be made in the materials, their method of incorporation and application to the glass fiber surfaces without departing from the spirit of the invention, especially as defined in the following claims.

I claim:

1. In an article of manufacture wherein mineral fibers are bonded with a resinous bonding material and wherein an anchoring agent is present in contact on the fiber surfaces to improve the bonding relationship between the resinous bonding material and the fibers, the improvement wherein the anchoring agent, present as a thin film in contact with the fiber surfaces between the resinous bonding agent and the fibers, is formed of the reaction product of a silane and a polyester resin wherein the polyester resin is formed of a polybasic acid and a polyhydric alcohol in which the latter is present in an amount to supply hydroxyl groups in excess of that capable of reaction with the polybasic acid, said anchoring agent differing from the resinous bonding material which is bonded through the anchoring agent to the fiber surfaces.

2. In a bonded glass fiber structure wherein glass fibers are bonded one to another by a resinous bonding material and wherein an anchoring agent is present in contact with the glass fiber surfaces to improve the bonding relationship between the glass fibers and the resinous material, the improvement wherein the anchoring agent, present as a thin film in contact with the glass fiber surfaces, between the resinous bonding material and the glass fibers, is formed of the reaction product of a silane and a polyester resin wherein the polyester resin is formed of a polybasic acid and a polyhydric alcohol in which the latter is present in amounts to supply hydroxyl groups in excess of that capable of reaction with the polybasic acid, said anchoring agent differing from the resinous material which is bonded through the anchoring agent to the glass fiber surfaces.

3. In a molded glass fiber structure wherein a resinous material in a substantially continuous phase is reinforced with glass fibers and wherein the glass fibers have an anchoring agent in contact with the surfaces thereof to increase the bonding relationship between the glass fibers and the resinous material, the improvement wherein the anchoring agent, present as a thin film in contact with the glass fiber surfaces between the resinous material and the glass fibers, is formed of the reaction product of a silane and a polyester resin wherein the polyester resin is formed of a polybasic acid and a polyhydric alcohol in which the latter is present in an amount to supply hydroxyl groups in excess of that capable of reaction with the polybasic acid, the resinous material differing from the anchoring agent which improves the bonding relationship between the glass fibers and the resinous material.

4. An article of manufacture as claimed in claim 2 in which the silane has at least two hydrolyzable groups and an organic group attached directly to the silicon atom containing less than 8 carbon atoms in aliphatic arrangement and which organic group also contains a highly functional group.

5. An article of manufacture as claimed in claim 2 in which the silane has an organic group attached directly to the silicon atom containing less than 8 carbon atoms in aliphatic arrangement and which also contains an unsaturated carbon to carbon linkage capable of addition polymerization.

6. An article of manufacture as claimed in claim 2 in which the silane is present in amount ranging from 2–20 percent by weight of the polyester resin.

7. An article of manufacture as claimed in claim 2 in which the glass fibers are present as discontinuous fibers in haphazard arrangement.

8. An article of manufacture as claimed in claim 2 in which the glass fibers are present as a textile fabric of glass fibers.

9. In the method of manufacturing a bonded structure of mineral fibers wherein a binder resin is applied to the fibers for securing the fibers one to another in the bonded structure, the step of pretreating the fibers prior to application of the resinous binder to provide a thin layer in contact with the fiber surfaces formed of the reaction product of a silane and a polyester resin wherein the polyester resin is formed of a polybasic acid and a polyhydric alcohol in which the latter is present in amounts to supply hydroxyl groups in excess of that capable of reaction with the polybasic acid to improve the bonding relationship between the resinous materials and the fiber surfaces, said thin layer of the reaction product, present as an anchoring agent on the fiber surfaces, differing from the resinous material bonding the fibers one to another.

10. In the method of manufacturing a molded glass fiber structure by impregnating glass fibers in haphazard arrangement with a binder resin, the step of pretreating the glass fibers prior to application of the resinous binder to provide a thin layer in contact with the glass fiber surfaces formed of the reaction product of a silane and a polyester resin wherein the polyester resin is formed of a polybasic acid and a polyhydric alcohol in which the latter is present in amount to supply hydroxyl groups in excess of that capable of reaction with the polybasic acid to improve the bonding relationship between the resinous material and the glass fiber surfaces, said thin layer of the reaction product, present as an anchoring agent on the glass fiber surfaces, differing from the resinous material bonding the fibers one to another.

11. In the method of manufacturing a bonded glass fiber structure by the application of a binder resin to textile fabrics of glass fibers, the step of pretreating the glass fibers prior to the application of the resinous binder to provide a thing layer in contact with the glass fiber surfaces formed of the reaction product of a silane and a polyester resin wherein the polyester resin is formed of a polybasic acid and a polyhydric alcohol with the latter present in amounts to supply hydroxyl groups in excess of that capable of reaction with the polybasic acid to improve the bonding relationship between the resinous binder and the glass fiber surfaces, said thin layer of the reaction product, present as an anchoring agent on the glass fiber surfaces, differing from the resinous binder securing the fibers one to another.

12. The method as claimed in claim 9 in which the silane has at least two hydrolyzable groups.

13. The method as claimed in claim 9 in which the silane has an organic group attached directly to the silicon atom containing less than 8 carbon atoms in aliphatic arrangement and also containing a highly functional group.

14. The method as claimed in claim 13 in which the highly functional group comprises an unsaturated carbon to carbon linkage in the aliphatic group.

15. The method as claimed in claim 9 in which the silane is present in amounts ranging from 2–20 percent by weight of the polyester resin.

References Cited in the file of this patent

UNITED STATES PATENTS

| | | |
|---|---|---|
| 2,491,409 | Kropa | Dec. 13, 1949 |
| 2,544,668 | Goebel et al. | Mar. 13, 1951 |
| 2,552,910 | Steinman | May 15, 1951 |
| 2,563,288 | Steinman | Aug. 7, 1951 |
| 2,605,243 | Sowa | July 29, 1952 |
| 2,607,755 | Bunnell | Aug. 19, 1952 |
| 2,624,720 | Hatcher et al. | Jan. 6, 1953 |